Feb. 12, 1935.  F. WINKLER  1,990,510
COASTER BRAKE FOR BICYCLES
Filed Dec. 17, 1932

Inventor
Franz Winkler
per
Dean Fairbank Hirsch & Foster
Attorneys

Patented Feb. 12, 1935

1,990,510

UNITED STATES PATENT OFFICE 1,990,510

COASTER BRAKE FOR BICYCLES

Franz Winkler, Schweinfurt, Germany

Application December 17, 1932, Serial No. 647,702
In Germany December 21, 1931

3 Claims. (Cl. 192—6)

The invention relates to coaster-brakes in free wheel hubs for bicycles and more particularly to disc brakes comprising discs or plates alternately engaging with an immovable body and with the rotating hub casing, the entire set of discs or plates being pressed against one another in a known way by a shiftable member of the free wheel mechanism when the brake is to be operated.

The novel feature of the device consists in the arrangement of additional discs or plates inserted between each rotating and immovable disc respectively of the brake, the additional discs being loose with respect to both adjacent brake discs so that friction will be distributed over the various contacting surfaces.

Another object of the invention is to make the loose discs which are co-axially guided between the co-operating discs upon the immovable body, of different metals or alloys to provide for a smooth operation and to prevent seizing of the brake.

In the accompanying drawing, which forms a part of this specification an embodiment of the invention is illustrated. In the drawing Fig. 1 is a longitudinal sectional view and a side view of a free wheel hub with a coaster-brake comprising the invention;

Like numerals designate like parts throughout all figures of the drawing.

Figure 1:
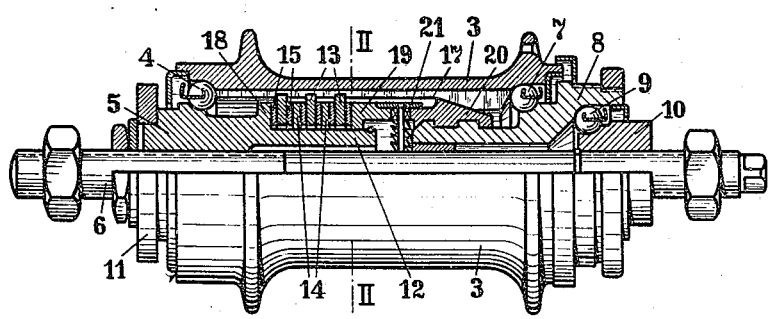

The hub shell 3 of the free wheel hub with coaster-brake is mounted, on the one hand, by means of a ball bearing 4 on a bearing cone 5 secured to the axle 5 and, on the other hand, by means of a ball bearing 7 on the driver 8 which in turn is rotatably mounted on the axle by means of a ball bearing 9 and a bearing cone 10.

Figure 2:
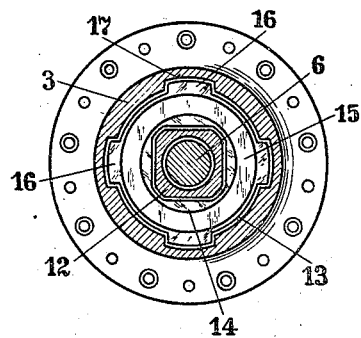
Fig. 2 shows a cross section on the line II—II of Fig. 1.
Figure 3:
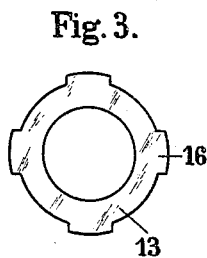
Fig. 3 is a lateral elevation of a brake disc adapted to engage the hub casing.
Figure 4:
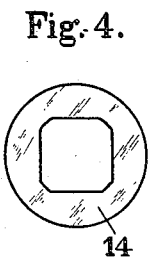
Fig. 4 is a lateral elevation of a brake disc having means for engaging an immovable body of the coaster-brake.
Figure 5:
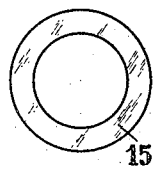
Fig. 5 is a lateral elevation of an intermediate disc according to the invention.

Between the hub shell 3 and the cone 5, which can rigidly be connected to the cycle frame as usual by a brake arm 11, there is arranged a disc brake to which purpose the inner end of the said cone is lengthened by an extension 12. The brake comprises discs 13 attached to the hub and discs 14 attached to the extension 12 and loose discs 15 placed between each two discs 13 and 14 and guided e. g. on the extension 12. The discs 13 and 14 are made for instance of steel while the loose intermediate discs 15 may consist of brass, bronze or another metal or alloy used for braking. The arrangement may also be provided in another manner e. g. the three sets of discs may be made of different material each. The discs 13 by radial projections 16 engage with longitudinal grooves 17 (Fig. 2) extending over the whole length of the bore of the hub shell 3. On the extension 12, which is e. g. of square section, the discs 14 are mounted with the corresponding square hole, but also other known means may be used for non-rotatably mounting the said discs upon said extension. The discs 15 are however rotatable with respect to both the discs 13 and 14. The one end of the set of discs 13—15 bears against a shoulder 18 of the member 5 and can be compressed by a member 19 adapted to operate against the other end of the said set of discs when it is displaced towards the brake but is not capable of turning about the extension 12.

A coupling sleeve 20 screwable on the drive 8 will be displaced in one direction or in the other according to the rotation of the driver. In the driving operation the coupling sleeve 20 is connected to the hub shell 3 but in the braking operation it is displaced in the contrary direction and bears against the operating member 19 under the action of a known friction spring 21 so as to shift the said member 19 towards the braking discs.

The loose intermediate discs 15 prevent the brake from seizing; moreover the brake is caused to start smoothly by the fact that these discs adjust themselves in accordance with the conditions of friction. The intermediate discs 15 may idle with the internal discs 12 or revolve with the external ones 13 but it is also possible that they revolve in respect to either set of discs so that braking is rendered more uniform.

What I claim is—

1. In combination with a bicycle hub having a rotatable hub shell, a coaster brake in the interior of said hub shell, and including a set of metal discs rotatable with said hub shell, a set of metal discs held against rotation and positioned alternately with said rotatable discs, a set of intermediate metal discs each being disposed between a rotatable disc and a non-rotatable disc for direct engagement therewith and loosely mounted for rotation with respect to said hub shell, all of said sets of discs having plane facing surfaces, and means for pressing all of said discs together for applying said brake to stop further rotation of said hub shell.

2. In combination with a bicycle hub having a rotatable hub shell, a brake for said hub shell and including a set of metal discs connected for rotation with said hub shell, a set of metal non-rotatable discs positioned alternately with respect to said rotatable discs, and a set of discs made of a metal different from that of said rotatable and non-rotatable discs and each disposed between a non-rotatable and rotatable disc for direct engagement therewith, said last mentioned set of discs being loosely mounted for rotation, all of said sets of discs having plane facing surfaces, and means for pressing all of said discs against each other for braking said hub shell.

3. In a device for use in a bicycle, a fixed axle, a rotatable hub shell supported on said axle, a set of metal brake discs having the periphery thereof interconnected wtih said hub shell so as to be rotatable therewith, a set of metal discs interlocked with said axle against rotation and positioned alternately with said rotatable discs, a set of loosely mounted metal discs each disposed between a rotatable and a non-rotatable disc for direct engagement therewith, all of said sets of discs having plane facing surfaces, a fixed abutment, an axially shiftable abutment, said abutments being disposed in the interior of said hub shell and confining the discs therebetween, and means for shifting the shiftable abutment for pressing all of said discs together into braking position.

FRANZ WINKLER.